3,822,260
6-(CYANOPHENYL)-4,5-DIHYDRO-
3(2H)-PYRIDAZINONES

William Vincent Curran, Pearl River, and Adma Schneller Ross, Suffern, N.Y., assignors to American Cyanamid Company, Stamford, Conn.
No Drawing. Continuation-in-part of abandoned application Ser. No. 79,670, Oct. 9, 1970. This application June 5, 1972, Ser. No. 259,723
Int. Cl. C07d 51/04
U.S. Cl. 260—250 A
9 Claims

ABSTRACT OF THE DISCLOSURE

This disclosure describes compounds of the class of 6-(o, m-, or p-cyanophenyl)-4,5-dihydro-3(2H) - pyridazinones useful as hypotensive agents.

CROSS REFERENCE TO RELATED APPLICATION

This application is a continuation-in-part of our co-pending application Ser. No. 79,670, filed Oct. 9, 1970, now abandoned.

BRIEF SUMMARY OF THE INVENTION

This invention relates to new organic compounds and, more particularly, is concerned with novel 6-(o-, m-, or p-cyanophenyl)-4,5-dihydro - 3(2H) - pyridazinones and with methods of preparing these compounds. The novel compounds of the present invention may be represented by the following general formula:

[structure with $R_1$, N—N, O=, $R_2$, $R_3$]

wherein $R_1$ is hydrogen or lower alkyl, $R_2$ is hydrogen or methyl, and $R_3$ is ortho-cyano, meta-cyano or para-cyano. Suitable lower alkyl groups contemplated by the present invention are those having up to four carbon atoms such as, for example, methyl, ethyl, n-propyl, isopropyl, isobutyl, sec-butyl, etc.

DETAILED DESCRIPTION OF THE INVENTION

The novel compounds of the present invention are generally obtainable as white or pale yellow to orange crystalline materials having characteristic melting points and absorption spectra and which may be purified by recrystallization from common organic solvents such as methanol, ethanol, and dimethylformamide. They are appreciably soluble in many organic solvents such as ethyl acetate, chloroform, dimethylsulfoxide, and the like but are relatively insoluble in water.

The novel compounds of the present invention wherein $R_1$ is hydrogen or methyl may be readily prepared by the interaction of an appropriately substituted 3-benzoylpropionic acid with hydrazine or methylhydrazine in accordance with the following reaction scheme

[reaction scheme: $R_3$—C(=O)—CH($R_2$)—CH$_2$CO$_2$H + H$_2$NNH$_2$ or H$_2$NNHCH$_3$ → pyridazinone with H (or CH$_3$), $R_3$, $R_2$]

wherein $R_2$ and $R_3$ are as hereinabove defined. This reaction is preferably carried out in a solvent such as a lower alkanol, dioxane, tetrahydrofuran, and the like, at steam bath temperature for a period of time of a few hours. The hydrazine is preferably employed in the form of the hydrate. The final products are isolated from the reaction mixtures and purified by conventional means well known to those skilled in the art.

The novel compounds of the present invention wherein $R_1$ is lower alkyl may be readily prepared by alkylating 6-(o-, m-, or p-cyanophenyl)-4,5-dihydro-3(2H)-pyridazinone or 6-(o-, m-, or p-cyanophenyl)-5-methyl-4,5-dihydro-3(2H)-pyridazinone with the appropriate lower alkyl halide. Suitable lower alkyl halides which may be thus employed are, for example, methyl iodide, ethyl iodide, n-propyl bromide, iso-propyl iodide, n-butyl chloride, iso-butyl bromide, sec-butyl iodide, and the like. The reaction is best carried out in the presence of powdered potassium hydroxide in an inert solvent such as acetone, dioxane, tetrahydrofuran, etc., at the reflux temperature for a few hours. The final products are isolated from the reaction mixtures and purified by conventional means well known to those skilled in the art.

Alternatively, the cyano compounds may be prepared by diazotization of an appropriately substituted 6-(o-, m-, or p-aminophenyl - 4,5 - dihydro - 3(2H) - pyridazinone (British Pats. No. 1,164,139 and No. 1,168,291) and replacement of the diazonium group with a cyano group. The diazotization is preferably carried out by adding sodium nitrite to a solution of the amine in dilute hydrochloric acid at a temperature of 0°–5° C. An excess of mineral acid is used over and above the amount needed to form the salt of the amine and to decompose the sodium nitrile. The resulting solution of diazonium salt is neutralized with a base, such as sodium bicarbonate, and added to a cold (10°–15° C.) aqueous solution of cuprous cyanide and potassium cyanide. After the addition, the resulting solution is stirred at room temperature for 10–20 hours during which time the desired cyano compound precipitates from the solution.

Typical compounds of the present invention which may be prepared by the above methods are, for example, 6-(o-cyanophenyl-4,5-dihydro-3(2H)-pyridazinone,
6-(o-cyanophenyl)-5-methyl-4,5-dihydro-3(2H)-pyridazinone,
6-(o-cyanophenyl)-2-methyl-4,5-dihydro-3(2H)-pyridazinone,
6-(m-cyanophenyl)-2-methyl-4,5-dihydro-3(2H)-pyridazinone,
6-(p-cyanophenyl)-2-methyl-4,5-dihydro-3(2H)-pyridazinone,
6-(o-cyanophenyl)-2,5-dimethyl-4,5-dihydro-3(2H)-pyridazinone,
6-(o-cyanophenyl)-2-ethyl-4,5-dihydro-3(2H)-pyridazinone,
6-(m-cyanophenyl)-2-ethyl-4,5-dihydro-3(2H)-pyridazinone,
6-(p-cyanophenyl)-2-ethyl-4,5-dihydro 3(2H)-pyridazinone,
6-(o-cyanophenyl-2-ethyl-5-methyl-4,5-dihydro-3(2H)-pyridazinone,
6-(m-cyanophenyl)2-ethyl-5-methyl-4,5-dihydro-3(2H)-pyridazinone,
6-(o-cyanophenyl)-2-(n-propyl)-4,5-dihydro-3(2H)-pyridazinone,
6-(m-cyanophenyl)-2-isopropyl-4,5-dihydro-3(2H)-pyridazinone,
6-(p-cyanophenyl)-2-(n-butyl)-4,5-dihydro-3,(2H)-pyridazinone,
6-(o-cyanophenyl)-2-isobutyl-4,5-dihydro-3(2H)-pyridazinone,
6-(m-cyanophenyl)-2-(sec-butyl)-4,5-dihydro-3(2H)-pyridazinone, 6 (o-cyanophenyl)-2-(n-propyl)-5-methyl-4,5-dihydro-3(2H)-pyridazinone,
6-(m-cyanophenyl)-2-isopropyl-5-methyl-4,5-dihydro-3(2H)-pyridazinone,
6-(p-cyanophenyl)2-(n-butyl-)-5-methyl-4,5-dihydro-3(2H)-pyridazinone,
6-(o-cyanophenyl)-2-isobutyl-5-methyl-4,5-dihydro-3(2H)-pyridazinone,
6-(m-cyanophenyl)-2-(sec-butyl)-5-methyl-4,5-dihydro-3(2H)-pyridazinone,
and the like.

The novel compounds of the present invention have long lasting hypotensive activity which was demonstrated in the following test procedure. Conscious male albino Sherman strain rats averaging approximately 250 grams in weight were fastened to rat boards in a supine position by means of canvas vests and limb ties. The femoral areas were anesthetized (subcutaneous infiltration of lidocaine), and the left or right common iliac arteries were exposed and clamped off proximally by an artery clamp and distally with thread. Incisions were made near the tie and short nylon catheters were inserted and tied in place. The other end of the catheters were fitted with 24 gauge hubless needles attached to thickwalled polyethylene tubes. The test compounds were administered to the animals orally by gavage (stomach tube). The test compounds were ordinarily suspended or dissolved in 2 percent aqueous starch solution, one milliliter of which gave, per 100 grams of body weight, the desired dose. Mean arterial blood pressure was measured 4 and 24 hours after administration of the compounds. Comparisons were then made to the mean control pressure of 121±7 mm. of mercury which is the average and standard deviation of a number of controls recorded over months of testing. Blood pressure measurements were made with four Statham P23 Db strain guages (Statham Instruments, Inc. Los Angeles, California), attached to a Sanborn Polyviso Recorder equipped with four strain gauge preamplifiers with averaging circuits for measuring mean arterial pressure. Table I summarizes the activity of typical compounds of the present invention and compares them with two previously disclosed compounds. It is obvious from an examination of Table I that the compounds of this invention possess hypotensive activity which is considerably longer lasting than that of the previously disclosed compounds.

TABLE I

| Compounds:* | Number of rats | Median arterial blood pressure (mm. of Hg) after— | |
|---|---|---|---|
| | | 4 hours | 24 hours |
| 6-(p-cyanophenyl)-4,5-dihydro-3(2H)-pyridazinone | 4 | 79 | 96 |
| 6-(m-cyanophenyl)-4,5-dihydro-3(2H)-pyridazinone | 3 | 92 | 100 |
| 6-(p-cyanophenyl)-5-methyl-4,5-dihydro-3(2H)-pyridazinone | 3 | 70 | 85 |
| 6-(m-cyanophenyl)-5-methyl-4,5-dihydro-3(2H)-pyridazinone | 3 | 66 | 75 |
| 6-(p-cyanophenyl)-2,5-dimethyl-4,5-dihydro-3(2H)-pyridazinone | 2 | 67 | 102 |
| 6-(m-cyanophenyl)-2,5-dimethyl-4,5-dihydro-3(2H)-pyridazinone | 2 | 64 | 96 |
| 6-(p-cyanophenyl)-2-ethyl-5-methyl-4,5-dihydro-3(2H)-pyridazinone | 1 | 74 | 79 |
| 6-(p-morpholinophenyl)-4,5-dihydro-3(2H)-pyridazinone | 3 | 93±14 | |
| 6-(p-aminophenyl)-4,5-dihydro-3(2H)-pyridazinone** | 3 | 79 | 110 |
| 6-(p-acetamidophenyl)-4,5-dihydro-3(2H)-pyridazinone** | 3 | 77 | 119 |
| Controls | 50 | 121±7 | |

*All compounds dosed at 100 mg./kg. of body weight.
**Disclosed in U.S. Pat. No. 3,475,431.

The novel compounds of the present invention may be administered either orally or parenterally. The amount of a single dose or of a daily dose to be given will vary but should be such as to give a proportionate dosage of from about one mg. to about 15 mg. per kilogram of body weight per day. Thus, such dosage units are employed that a total of from about 50 mg. to about 1.0 g. for a subject of about 70 kg. body weight are administered in a 24 hours period. The dosage regimen may be adjusted to provide the optimum therapeutic response, for example, several doses of 25–250 mg. may be administered daily or the dose may be proportionately reduced as indicated by the exigencies of the therapeutic situation.

The compounds may be orally administered, for example, with an inert diluent or with an assimilable edible carrier, or they may be enclosed in hard or soft shell gelatin capsules, or they may be compressed into tablets, or they may be incorporated directly with the food of the diet. For oral therapeutic administration, the novel compounds of this invention may be incorporated with excipients and used in the form of tablets, troches, capsules, elixirs, suspensions, syrups, wafers, and the like. Such compositions and preparations should contain at least 0.1% of active compound. The percentage in the compositions and preparations may, of course, be varied and may conveniently be between about 5% to about 75% or more of the weight of the unit. The amount of active compound in such therapeutically useful compositions or preparations is such that a suitable dosage will be obtained. Preferred compositions or preparations are prepared so that an oral dosage unit form contains between about 25 and 250 milligrams of active compound.

The tablets, troches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as magnesium stearate; and a sweetening agent such as sucrose, lactose, or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar, or both. A syrup or elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and substantially non-toxic in the amounts employed.

Compositions having the desired clarity, stability, and adaptability for parenteral use are obtained by dissolving from 0.10% to 10.0% by weight of a 6-(o-, m-, or p-cyanophenyl) - 4,5 - dihydro - 3(2H) - pyridazinone is a vehicle consisting of a mixture of non-volatile, normally liquid polyethylene glycols which are soluble in both water and organic liquids and which have molecular weights of from about 200 to about 1500. Such mixtures of polyethylene glycols are commercially available and are usually obtained by condensing glycol with ethylene oxide. Although the amount of 6-(o-, m-, or p-cyanophenyl)-4,5-dihydro - 3(2H) - pyridazinone dissolved in the above vehicle may vary from 0.10% to 10.0% by weight, it is preferred that the amount employed be from about 3.0% to about 9.0% by weight. Although various mixtures of the aforementioned nonvolatile polyethylene glycols may be employed, it is preferred to use a mixture of non-volatile polyethylene glycols having an average molecular weight of about 400. Such a mixture is usually referred to as polyethylene glycol 400. A preferred embodiment comprises a clear solution of from about 3.0% to about 9.0% by weight of the 6-, o-, m-, or p-, -cyanophenyl)-4,5-dihydro - 3(2H) - pyridazinone dissolved in an aqueous solution of polyethylene glycol 400. In addition to the 6-(o-, m-, or p-cyanophenyl) - 4,5 - dihydro - 3(2H)-pyridazinone, the parenteral solutions may also contain various preservatives wihch may be used to prevent bacterial and fungal contamination or chemical degradation.

The novel compounds of the present invention possess an asymmetric carbon atom at the 5-position (when $R_2$ is methyl) and hence may exist in more than one stereoisomeric form. It is to be understood that the present invention includes within its scope all such stereoisomeric forms.

The invention will be described in greater detail in conjunction with the following specific examples which are given solely for the purpose of illustration and are not to be construed as limitations of this invention.

EXAMPLE 1

Preparation of 6-(p-cyanophenyl)-4,5-dihydro-3(2H)-pyridazinone

A solution of 3.8 g. of 6-(p-aminophenyl)-4,5-dihydro-3(2H)-pyridazinone in 150 ml. of water containing 15 ml. of concentrated hydrochloric acid is cooled to 5° C. and a cold solution of sodium nitrite (1.4 g. in 10 ml. of water) is added in several portions. This solution is neutralized with sodium carbonate and added to a stirred, cold solution of 2.24 g. of cuprous cyanide and 4.0 g. of potassium cyanide in 100 ml. of water. The mixture is stirred at room temperature overnight, then the orange crystalline precipitate is collected; M.P. 245°–255° C. dec.

EXAMPLE 2

Preparation of 6-(m-cyanophenyl)-4,5-dihydro-3(2H)-pyridazinone

A solution of 3.8 g. of 6-(m-aminophenyl)-4,5-dihydro-3(2H)-pyridazinone in 9 ml. of concentrated hydrochloric acid plus 100 ml. of water is cooled to 0°–3° C. A cold solution of 1.4 g. of sodium nitrite in 10 ml. of water is added, and the pH is carefully adjusted to 5.5. This solution is added slowly to a vigorously stirred, cold solution of 2.23 g. of cuprous cyanide and 4.0 g. of potassium cyanide in 20 ml. of water. The reaction mixture is stirred at room temperature for 4 hours and then at 50° C. for 30 minutes. The orange crystalline solid is filtered off and recrystallized from ethanol; m.p. 187.5°–188.5° C.

EXAMPLE 3

Preparation of 6-(p-morpholinophenyl)-4,5-dihydro-3(2H)-pyridazinone 3-(p-Morpholinopbenzoyl)propionic acid (1.3 g.), 0.2 ml. of hydrazine and 5 ml. of ethanol are refluxed for 3 hours. The solution is cooled, and the crystals which formed are recrystallized from ethanol-water; m.p. 220°–221.5° C.

EXAMPLE 4

Preparation of 3-(p-acetamidobenzoyl)crotonic acid

Ground acetanilide (135 g.) is added to a cold mechanically stirred, suspension of 490 g. of aluminum chloride in 650 ml. of carbon disulfide. The vigorous exotherm which occurs yields a thick, black sludge, and is 112 g. (90 ml.) of citraconic anhydride is added, the mixture becomes more mobile. The mixture is refluxed with stirring until the stirrer stops and then is allowed to stand at room temperature for five days. After the carbon disulfide is decanted, the complex is decomposed using ice and 37% hydrochloric acid. The aqueous layer and solid are extracted with benzene and then into aqueous bicarbonate. The bicarbonate solution is treated with activated carbon and acidified to pH 2 to precipitate a brown gum (ca. 98 g.). The gum is stirred with ethyl acetate. The ethyl acetate layer is dried over magnesium sulfate and evaporated to an oil which is crystallized from acetone-water to give in three crops 51 g. of off-white crystals, m.p. 130°–136° C.

EXAMPLE 5

Preparation of 3-(p-acetamidobenzoyl)butyric acid

To a solution of 5.0 g. of 3-(p-acetamidobenzoyl)crotonic acid in 45 ml. water and 3.0 ml. glacial acetic acid is added 3.0 g. zinc dust and the mixture is heated on a steam bath for 30 minutes. Solid material is filtered off and concentrated hydrochloric acid is added to the filtrate until the product oils out. The oil is separated, washed with water, and crystallizsed from ethanol-water to give 4.6 g. (92%) of white crystals, m.p. 94.5–103.0° C. Recrystallization from a small volume of ethanol gives 2.6 g. of white crystals, m.p. 147°–149° C.

EXAMPLE 6

Preparation of 4'-(1,4,5,6-tetrahydro-4-methyl-6-oxo-3-pyridazinyl)acetanilide

A solution of 3.9 g. of 3-(p-acetamidobenzoyl)butyric acid and 1.7 ml. of 99% hydrazine hydrate in 25 ml. of ethanol is heated at reflux temperature for 2 hours. The mixture is cooled in an ice-bath and filtered to give 2.57 g. of white crystals, m.p. 238°–239° C.

EXAMPLE 7

Preparation of 6-(p-aminophenyl)-4,5-dihydro-5-methyl-3(2H)-pyridazinone

A mixture of 2.5 g. of 4'-(1,4,5,6-tetrahydro-4-methyl-6-oxo-3-pyridazinyl)acetanilide, 25 ml. of 10N sodium hydroxide solution and 25 ml. of methanol is heated at reflux temperature for 2.5 hours. The methanol is removed by evaporation and the residual solution is cooled, diluted with water, and stored at 4° C. for 16 hours. Filtration gives 1.3 g. of white crystals, m.p. 195°–197° C.

EXAMPLE 8

Preparation of p-(1,4,5,6-tetrahydro-4-methyl-6-oxo-3-pyridazinyl)benzonitrile

Using the procedure of Example 1, treatment of 6.65 g. of 6-(p-aminophenyl)-4,5-dihydro-5-methyl-3-(2H)-pyridazinone in 170 ml. of water containing 13.3 ml. of 37% hydrochloric acid solution with an aqueous solution of 2.38 g. of sodium nitrite gives a solution which is neutralized with sodium carbonate and stirred with 3.79 g. of cuprous cyanide and 6.65 g. of potassium cyanide. Filtration furnishes 6.47 g. of product as yellow crystals, m.p. 194°–196° C.

EXAMPLE 9

Preparation of 4,5-dihydro-5-methyl-6-(m-nitrophenyl)-3(2H)-pyridazinone

3-Benzoylbutyric acid (2.5 g.) [Lutz et. al., J.A.C.S. 75, 5039 (1953)] is dissolved in 20 ml. of conc. nitric acid, cooled and 20 ml. of conc. sulfuric acid is added over 30 minutes with stirring. The mixture is then stirred at room temperature for 1.5 hours and then poured onto ice. The resulting gum is extracted with chloroform which is washed with saturated salt solution then dried ($MgSO_4$). Evaporation of the chloroform gives 3-(m-nitrobenzoyl) butyric acid.

The above acid is refluxed for 1.0 hour in 20 ml. of ethanol containing 1.0 ml. of hydrazine hydrate, treated with Norit, and filtered. The filtrate deposited 0.55 g. of crystals of the product: m.p. 189°–192° C. For analytical purposes this product is recrystallized from ethanol to afford light yellow crystals: m.p. 191°–194° C.

EXAMPLE 10

Preparation of 6-(m-anilino)-5,6-dihydro-5-methyl-3(2H)-pyridazinone

A mixture of 4,5-dihydro-5-methyl-6-(m-nitrophenyl)-3(2H)-pyridazinone (0.5 g.), 0.25 g. of 10% palladium-on-carbon, 20 ml. of ethanol, and 10 ml. of cyclohexene is refluxed for 18 hours, filtered, and evaporated to give an oil which crystallizes. Recrystallization from ethyl acetate-hexane and then from ethanol affords 0.2 g. (46%) of the product: m.p. 143°–145° C.

EXAMPLE 11

Preparation of m-(1,4,5,6-tetrahydro-4-methyl-6-oxo-3-pyridazinyl)benzonitrile

Using the procedure of Example 1, 6.65 g. of 6-(m-anilino)-5,6-dihydro-5 - methyl-3(2H)-pyridazinone gives 6.56 g. of the product as pale yellow crystals, m.p. 189°–191° C.

EXAMPLE 12

Preparation of p-(1,4,5,6-tetrahydro-1,4-dimethyl-6-oxo-3-pyridazinyl)benzonitrile A mixture of 330 mg. of p-(1,4,5,6-tetrahydro-4-methyl-6-oxo-3-pyridazinyl)benzonitrile and 430 mg. of powdered potassium hydroxide in 10 ml. of acetone is treated with 1 ml. of methyl iodide. The mixture is stirred at reflux temperature for 30 minutes, after which the volatile material is removed under reduced pressure. The residue is triturated with water to give a solid that is collected by filtration and then recrystallized from methylene chloride-petroleum ether (b.p. 30°–60° C.) to give 260 mg. of yellow crystals, m.p. 170°–172° C.

EXAMPLE 13

Preparation of m-(1,4,5,6-tetrahydro-1,4-dimethyl-6-oxo-3-pyridazinyl)benzonitrile Using the procedure of Example 12, 1.00 g. of m-(1,4,5,6 - tetrahydro - 4 - methyl-6-oxo-3-pyridazinyl)benzonitrile, 1.29 g. of powdered potassium hydroxide and 3 ml. of methyl iodide in 30 ml. of acetone give an oil that crystallizes on trituration with petroleum ether containing a little ether. Recrystallization of the solid from ether-petroleum ether (b.p. 30°–60° C.) gives 450 mg. of yellow crystals, m.p. 80°–81° C.

EXAMPLE 14

Preparation of p-(1-ethyl-1,4,5,6-tetrahydro-4-methyl-6-oxo-3-pyridazinyl)benzonitrile A mixture of 1.00 g. of p-(1,4,5,6-tetrahydro-4-methyl-6-oxo-3-pyridazinyl)benzonitrile, 1.29 g. of powdered potassium hydroxide and 5.8 g. of ethyl iodide in 30 ml. of acetone is stirred at reflux temperature for two hours. The volatile material is removed under reduced pressure and the residue is distributed between methylene chloride and water. The organic solution is dried over magnesium sulfate, filtered to remove the drying agent, and evaporated with concomittant addition of petroleum ether (b.p. 30°–60° C.) until crystallization begins. Filtration of the cooled mixture gives 0.56 g. of yellow needles, m.p. 93.5°–95.0° C.

EXAMPLE 15

Preparation of 3-(p-cyanobenzoyl)propionic acid

To a cold, stirred solution of 25.0 g. of p-aminobenzoylpropionic acid {prepared by alkaline hydrolysis of p-acetamidobenzoylpropionic acid [J. P. English et al., J. Amer. Chem. Soc. 67, 2263 (1945)]} in 600 ml. of water containing 100 ml. of concentrated hydrochloric acid is added a cold solution of sodium nitrite (9.1 g.) in 60 ml. of water over 15 minutes. The solution is carefully neutralized with sodium carbonate and then added, in several portions, to a cold, stirred solution of cuprous cyanide (14.0 g.) and potassium cyanide (20.0 g.) in 400 ml. of water which is covered with 100 ml. of toluene. The mixture is stirred in the cold for 0.5 hour and then at room temperature overnight. Filtration removes a small amount of yellow solid and the filtrate is acidified with 50 ml. of concentrated hydrochloric acid. The resulting dark brown solid is collected and extracted with a boiling solution of 800 ml. of chloroform:benzene (1:1). The extract deposits orange crystals on cooling; 11.2 g. m.p. 157°–161° C. For analytical purposes a sample is recrystallized from ethyl acetate. The melting point is raised to 161°–163.5° C.

EXAMPLE 16

Preparation of 6-(p-cyanophenyl)-4,5-dihydro-2-methyl-3(2H)-pyridazinone

A solution of 2.00 g. of 3-(p-cyanobenzoyl)propionic acid and 2.00 ml. of methylhydrazine in 50 ml. of ethanol containing six drops of glacial acetic acid is heated at reflux temperature for 4 hours. The solution is concentrated until solid begins to separate. The mixture is cooled and filtered to provide the product as white crystals, m.p. 138°–140° C.

What is claimed is:

1. A compound of the formula:

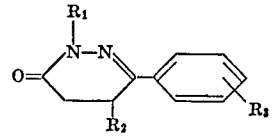

wherein $R_1$ is selected from the group consisting of hydrogen and alkyl having up to four carbon atoms, $R_2$ is selected from the group consisting of hydrogen and methyl, and $R_3$ is selected from the group consisting of meta-cyano and para-cyano.

2. The compound according to Claim 1 wherein $R_1$ and $R_2$ are hydrogen and $R_3$ is para-cyano.

3. The compound according to Claim 1 wherein $R_1$ and $R_2$ are hydrogen and $R_3$ is meta-cyano.

4. The compound according to Claim 1 wherein $R_1$ is methyl, $R_2$ is hydrogen and $R_3$ is para-cyano.

5. The compound according to Claim 1 wherein $R_1$ and $R_2$ are methyl and $R_3$ is para-cyano.

6. The compound according to Claim 1 wherein $R_1$ is hydrogen, $R_2$ is methyl and $R_3$ is para-cyano.

7. The compound according to Claim 1 wherein $R_1$ is hydrogen, $R_2$ is methyl and $R_3$ is meta-cyano.

8. The compound according to Claim 1 wherein $R_1$ and $R_2$ are methyl and $R_3$ is meta-cyano.

9. The compound according to Claim 1 wherein $R_1$ is ethyl, $R_2$ is methyl and $R_3$ is para-cyano.

References Cited

Schier and Marxer; "Antihypertensive Agents, 1962–1968" in Fortschr. Arzneimittelforsch. 13, 117 (1969).

Augstein, et al.: J. Med. Chem. 8, 356–359 (1965).

Short and Darby, J. Med. Chem. 10, 833–35 (1967).

Gadekar, et al.; J. Med. Chem. 11, 811–813 (1968).

DONALD G. DAUS, Primary Examiner

R. D. McCLOUD, Assistant Examiner

U.S. Cl. X.R.

260—465 D; 424—250